(12) United States Patent
Brungot et al.

(10) Patent No.: US 7,307,537 B2
(45) Date of Patent: Dec. 11, 2007

(54) IDENTIFICATION TAG

(75) Inventors: John Brungot, Fagerstrand (NO); Lars Hoff, Bekkestua (NO); Sverre Holm, Acker (NO); Arne Rønnekleiv, Trondhelm (NO); Dag Thorstein Wang, Oslo (NO); Ralph William Bernstein, Bekkestua (NO)

(73) Assignee: Vivid AS, As (NO)

( * ) Notice: Subject to any disclaimer, the term of this patent is extended or adjusted under 35 U.S.C. 154(b) by 473 days.

(21) Appl. No.: 10/496,666

(22) PCT Filed: Nov. 27, 2002

(86) PCT No.: PCT/NO02/00448

§ 371 (c)(1),
(2), (4) Date: Oct. 19, 2004

(87) PCT Pub. No.: WO03/046801

PCT Pub. Date: Jun. 5, 2003

(65) Prior Publication Data

US 2007/0063852 A1  Mar. 22, 2007

(30) Foreign Application Priority Data

Nov. 27, 2001  (NO) .................................. 20015792

(51) Int. Cl.
G08B 23/00 (2006.01)

(52) U.S. Cl. .............................. 340/573.3; 340/539.13; 340/554; 340/573.2; 367/6; 367/118; 367/120

(58) Field of Classification Search ............. 340/573.3, 340/573.4, 539.1, 539.13, 618, 554, 573.2; 367/1, 2, 6, 118, 120, 127, 131, 134
See application file for complete search history.

(56) References Cited

U.S. PATENT DOCUMENTS

| 5,134,370 | A | | 7/1992 | Jefferts | |
|---|---|---|---|---|---|
| 5,469,403 | A | * | 11/1995 | Young et al. | ................... 367/6 |
| 5,481,102 | A | | 1/1996 | Hazelrigg | |
| 5,552,778 | A | | 9/1996 | Schott | |
| 5,570,323 | A | * | 10/1996 | Prichard et al. | ............ 367/118 |

(Continued)

FOREIGN PATENT DOCUMENTS

DE  40 20 752  10/1991

(Continued)

*Primary Examiner*—Davetta W. Goins
(74) *Attorney, Agent, or Firm*—Christian D. Abel

(57) ABSTRACT

The invention relates to an identification chip for insertion in an object located in a liquid. The identification chip comprises an acoustic resonator (100), which exhibits a number of distinct resonant frequencies, where the combination of resonant frequencies is unique to the identification chip. This enables the identification chip to be identified by exposing it to an acoustic polling signal, measuring an acoustic response signal and analysing the frequency of the response signal. The resonator (100) comprises a cavity-forming part (110, 120) and a membrane (130). The acoustic resonant frequencies are determined by at least one cavity (140), which is enclosed by the cavity-forming part (110, 120) and the membrane (140). The identification chip can be implanted in a fish, with the object of identifying the fish when it is located in water.

17 Claims, 5 Drawing Sheets

U.S. PATENT DOCUMENTS

| | | | |
|---|---|---|---|
| 5,726,626 A * | 3/1998 | Jabbour et al. | 340/407.1 |
| 6,163,503 A * | 12/2000 | Gudbjornsson | 367/6 |
| 6,369,713 B1 * | 4/2002 | Halleck et al. | 340/573.4 |
| 6,532,192 B1 * | 3/2003 | Reid | 367/127 |
| 6,766,745 B1 * | 7/2004 | Kuklinski et al. | 102/402 |

FOREIGN PATENT DOCUMENTS

| | | |
|---|---|---|
| NO | 884144 | 3/1990 |
| WO | WO 90/03070 | 3/1980 |

* cited by examiner

IDENTIFICATION TAG

TECHNICAL FIELD

The invention relates in general to identification systems, wherein an identification chip associated with an object is identified by means of acoustic remote polling.

The invention relates especially to an identification chip for insertion in an object, which is located in a liquid when it has to be identified.

BACKGROUND TO THE INVENTION

There is a need for tagging objects located in a liquid, such as water, including salt water.

Developments in the fish farming industry in particular, with increased requirements for quality control and traceability, have resulted in a need to tag and identify living organisms, particularly fish, which are located in water.

There is therefore a need for an identification chip, which can be implanted easily, quickly and inexpensively in a living organism such as a living fish, which can remain permanently implanted in the fish without inconvenience to the fish, to the fish's growth or the quality of products that are subsequently produced from the fish, which is inexpensive to manufacture, which operates without stored energy, which can be used with inexpensive and simple detection/sensing equipment, which permits a large number of distinct identification codes, which permits efficient and reliable detection/reading through the tissue of the fish, through water and while the fish is in motion, which works satisfactorily under varying pressure conditions, from atmospheric pressure to water pressure at great depth, which works satisfactorily under varying temperature conditions, and which is difficult to manipulate.

THE STATE OF THE ART

NO-884144 describes an identification system for identification of fish, where a combined receiver, programming and transmitter body is implanted in a fish. The combined implantable body is described as a chip with electronic circuits, and in an embodiment is declared to be capable of transmitting "echo energy", which is attributable to the energy transmitted by a transmitter/reader body. The publication indicates no solution for how such a chip should be implemented in order to obtain an identification chip, which does not require internal energy storage or supply, which offers a great number of distinct identification combinations, and which moreover permits efficient and reliable identification through the tissue of the fish, through water and while the fish is in motion.

U.S. Pat. No. 5,134,370 describes an apparatus for detection of identification chips, where a chip can be implanted in a fish. In this case the chip is based on polling with electromagnetic signals. This kind of equipment is unsuitable for identification of objects located in water, such as living fish, on account of the water's absorption of the electromagnetic signals.

SUMMARY OF THE INVENTION

An object of the present invention is to provide an identification chip that is suitable for identifying an object located in a liquid such as water, including salt water.

A second object of the invention is to provide a method for tagging an object that has to be identified when it is located in a liquid.

A further object of the invention is to provide a method for tagging and identifying an object located in a liquid.

Yet another object of the invention is to provide a system for tagging and identifying an object located in a liquid.

The above objects and other advantages are achieved by means of the features that will be apparent from the following patent claims.

BRIEF DESCRIPTION OF THE DRAWINGS

The invention will now be described in greater detail in the form of a preferred embodiment with reference to the drawings, in which.

DETAILED DESCRIPTION OF THE INVENTION

Figure 1A:
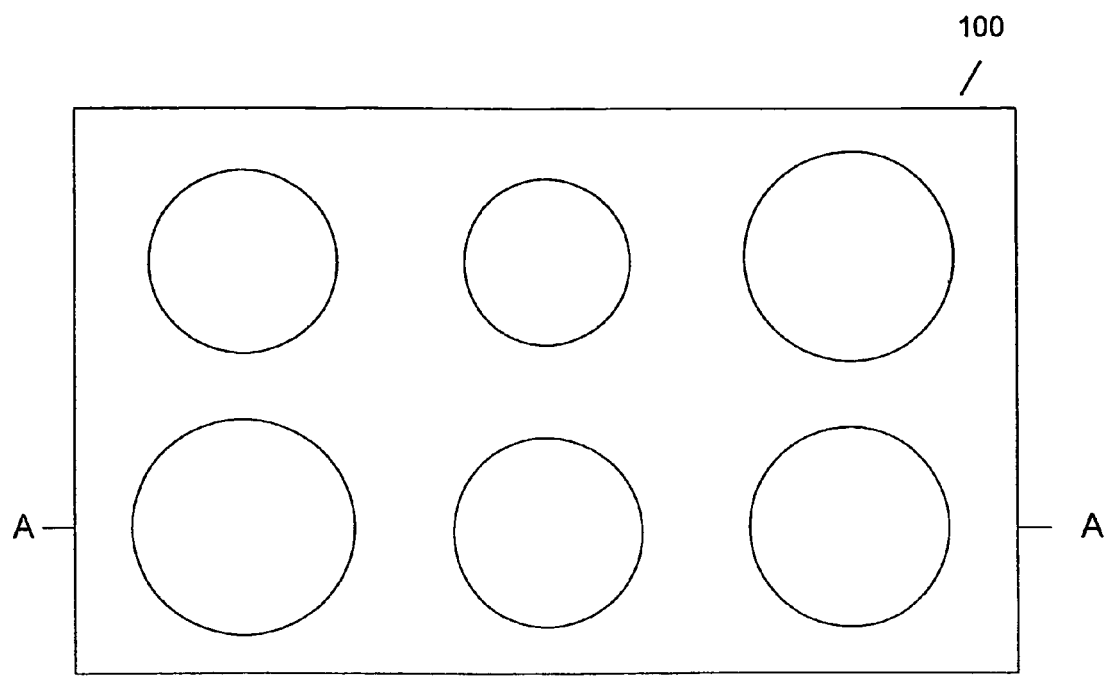
FIGS. 1A-1B are a top view and a cross sectional view of an identification chip according to the invention.
Figure 1B:
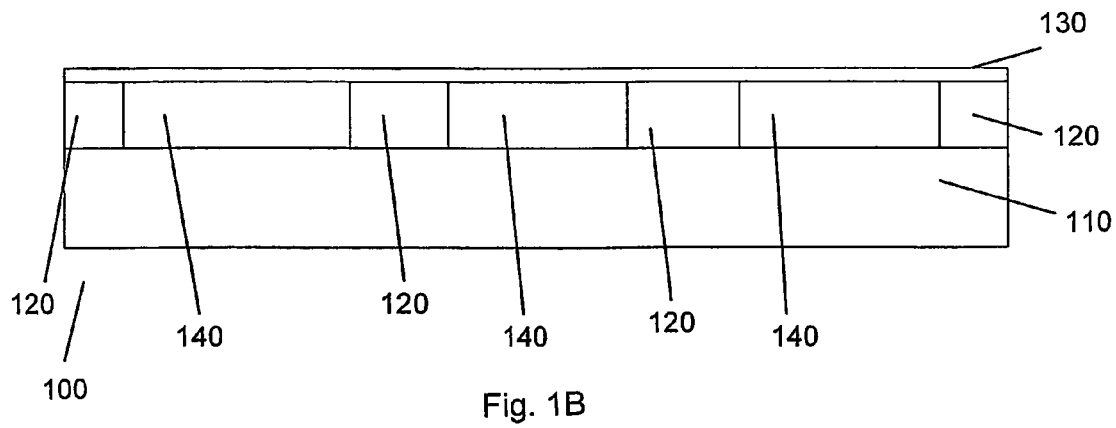

FIG. 1A is a top view of an identification chip for identifying an object located in a liquid, according to the invention. FIG. 1B is a cross sectional view of the identification chip along axis A-A in FIG. 1A.

The chip comprises and is composed of an acoustic resonator 100, which exhibits a number of distinct resonant frequencies, where the combination of resonant frequencies is unique to the identification chip. This permits the identification chip to be identified by exposing the chip to an acoustic polling signal, measuring an acoustic response signal and analysing the frequency of the response signal.

The resonator 100 comprises a cavity-forming part 110, 120 and a membrane 130. The acoustic resonant frequencies for the resonator are determined by the six cavities 140 enclosed by the cavity-forming part 110, 120 and the membrane 140.

The cavity-forming part 110, 120 is composed of a substrate 110 with an upper surface, and an etchable disc 120 with a lower surface that is attached to the upper surface of the substrate 110. The substrate 110 is composed of a glass wafer, while the etchable disc 120 is made of silicon.

The upper surface of the etchable disc 120 is also attached to the lower surface of the membrane 130. The etchable disc 120 further comprises six through-going, circular openings between the lower and upper surfaces, with the result that each of the six cavities is enclosed by the substrate, the corresponding through-going opening and the membrane.

FIG. 1B is a cross sectional view of the identification chip along axis A-A in FIG. 1A. The figure therefore illustrates the three of a total of six cavities 140 included in the resonator 100 that are intersected by axis A-A. FIG. 1B illustrates that each cavity is enclosed by the substrate 110, the etchable disc 120 and the membrane 130.

FIG. 1A illustrates that the resonator 100 may be rectangular in shape, viewed from above. In a practical embodiment the shape may be more elongated or rod shaped than that illustrated in FIG. 1A. This offers practical advantages when inserting an identification chip in an organism such as a fish, where the insertion should advantageously be performed through a hole with the smallest possible cross section.

FIGS. 1A-1B illustrate that the cavities are of different sizes, particularly different cross sections, and more specifically different diameters where each cavity's cross section is circular.

The number of cavities is decisive for the number of possible coding combinations. If the number of cavities with distinct resonant frequency is designated as n, the number of possible coding combinations is $2^n-1$.

Resonators with different combinations of cavity cross section can be manufactured directly, or chips can be produced with a full set of cavity combinations, which are subsequently encoded by destroying the membranes for those cavities that are not to be included in the code.

FIGS. 2A-2E illustrate cross sections of different embodiments of an identification chip according to the invention.

Figure 2A:
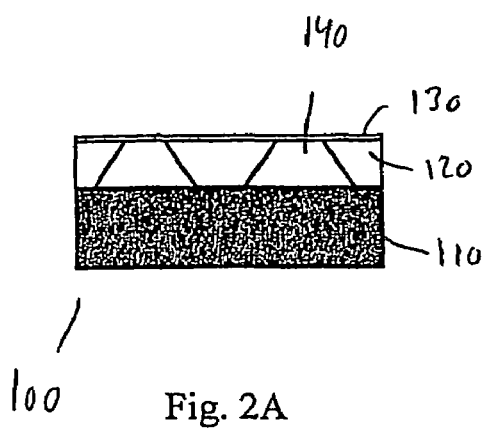
FIGS. 2A-2E are cross sectional views of different embodiments of an identification chip according to the invention.

FIG. 2A illustrates a cross section of a first embodiment of an identification chip for implanting in a living organism such as a fish.

The identification chip comprises an acoustic resonator 100, which exhibits a number of distinct resonant frequencies, where the combination of resonant frequencies is unique to the identification chip. This permits the identification chip to be identified by exposing the chip to an acoustic polling signal, measuring an acoustic response signal and analysing the frequency of the response signal.

The resonator 100 comprises a cavity-forming part, which in the embodiment in FIG. 2A is composed of a substrate in the form of a glass wafer 110 and an etchable part in the form of a silicon wafer 120. The lower surface of the silicon wafer 120 is attached to the upper surface of the glass wafer 110 by means of anodic bonding. The silicon wafer 120 comprises two through-going openings between the lower and upper surfaces.

The silicon wafer's 120 upper surface is also attached to the lower surface of a membrane 130 made of silicon nitride. A membrane is preferably employed with moderate pre-stressing, which is typically of the order of 50 MPa-500 MPa, preferably in the range 100 MPa-300 MPa.

The walls of the through-going openings are sloping, with the result that the opening on the lower surface of the silicon wafer is larger than the opening on the upper surface. This shape is the result of the manufacturing process, which is based on a silicon nitride membrane, to which an all-enveloping silicon layer is attached in advance, and subsequent anisotropic wet etching by means of potassium hydroxide KOH for removal of the silicon material corresponding to the resulting openings. Such a process results in square membrane sections with sloping (54.7°) side walls.

The glass wafer 110, the silicon wafer 120 and the membrane 130 thereby enclose two cavities 140 of different size. These cavities determine two distinct resonant frequencies for the resonator 100.

Figure 2B:
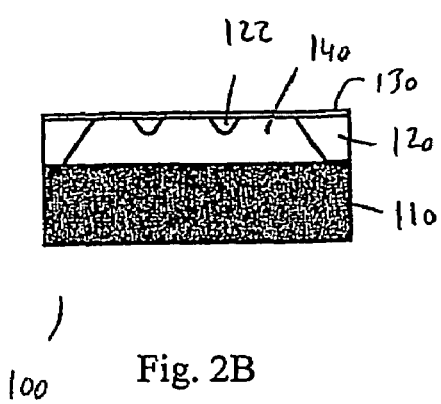

FIG. 2B illustrates an embodiment of the identification chip where the silicon wafer 120 has only one through-going opening between the lower and upper surfaces, with the result that the chip comprises one cavity. The membrane's 130 lower surface, however, comprises areas 122 covered by silicon material. Those membrane sections not covered by silicon on the lower surface are of a different size. On account of this, the chip 100 will still exhibit several different resonant frequencies as long as the rigidity in the beams 122 is sufficiently great to enable the membrane sections to vibrate fairly independently of one another.

This embodiment requires a smaller total substrate area, and therefore allows better use to be made of the silicon material compared with the embodiment in FIG. 2A. However, a certain amount of acoustic coupling will occur between the uncovered membrane sections, and the chip will have a lower value for acceptable maximum pressure on account of lack of attachment of the membrane at several points.

Figure 2C:
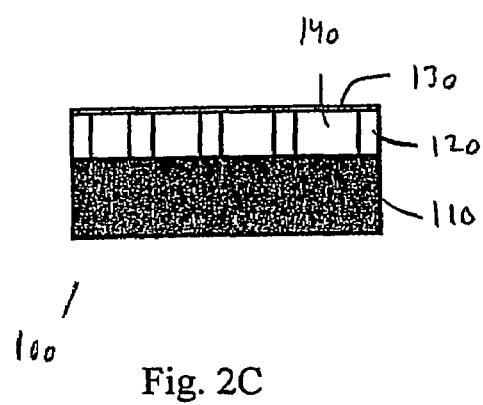

FIG. 2C illustrates an embodiment of the identification chip that resembles the embodiment in FIGS. 1A-B, where the silicon wafer 120 has four through-going openings between the lower and upper surfaces, with the result that the chip comprises four cavities.

The walls of the through-going openings are perpendicular to the common horizontal direction for the glass wafer, the silicon wafer and the membrane, with the result that the opening on the lower surface of the silicon wafer is almost identical to the opening on the upper surface. This shape is the result of the production process, which is based on a silicon nitride membrane, to which a completely covering silicon layer is attached in advance, and a subsequent dry, reactive ionic etching (RIE etching) for removal of the silicon material corresponding to the resulting openings. Such a process results in membrane sections with approximately straight side walls. This provides very good utilisation of space, but requires a more complicated production process.

Figure 2D:
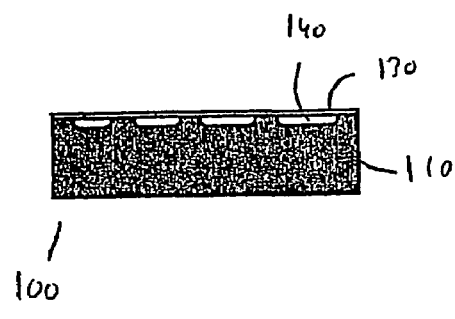

FIG. 2D illustrates an identification chip where the cavity-forming part is composed solely of a substrate in the form of a glass wafer 110. The upper surface of the glass wafer 110 has four recesses with different areas, but the same depth. The lower surface of the membrane 130 is attached to the upper surface of the glass wafer 110. This results in each of the four cavities being enclosed by a recess and a section of the membrane 130.

The first stage in the manufacture of this embodiment is to form the recesses 140 in the glass wafer by means of etching. The silicon nitride membrane is then affixed, being initially attached to a silicon wafer, whereupon all the silicon material is removed by etching.

Figure 2E:
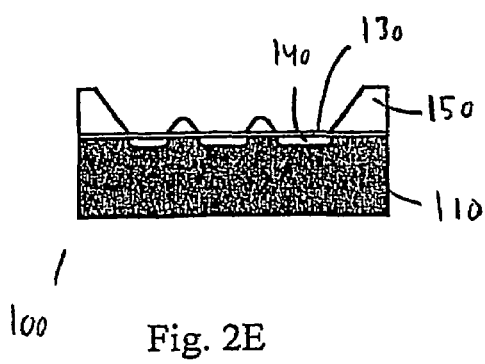

In FIG. 2E the upper surface of the membrane 130 is attached to the lower surface of a silicon wafer 150, which has through-going openings. Each opening coincides with one of three etched recesses in the glass wafer 110.

In all the embodiments in FIGS. 2A-2E, the cavities 140 preferably contain a vacuum. It is also possible to replace the vacuum with a gas, in which case it will be advantageous if the said gas is air or a gas with large "heavy" molecules.

The object of this is to be able to restrict diffusion as much as possible. Examples of "heavy" gases are fluorated hydrocarbons and $SF_6$.

In all the embodiments in FIGS. 2A-2E, the identification chip advantageously comprises a reference cavity with a predefined resonant frequency for use in calibration and compensation for pressure and temperature variations. The earlier statement that the cavities may contain a vacuum, air or another gas also applies to the reference cavity.

In all the embodiments in FIGS. 2A-E, the identification chip may advantageously comprise an encapsulation (not shown) round the resonator. The encapsulation is preferably made of a biocompatible material such as, e.g., water as ice or another material with acoustic properties resembling the properties of water, thus ensuring that the encapsulation does not substantially influence the acoustic properties of the resonator. Alternatively, the chip may be composed of the resonator without encapsulation.

Figure 3A:
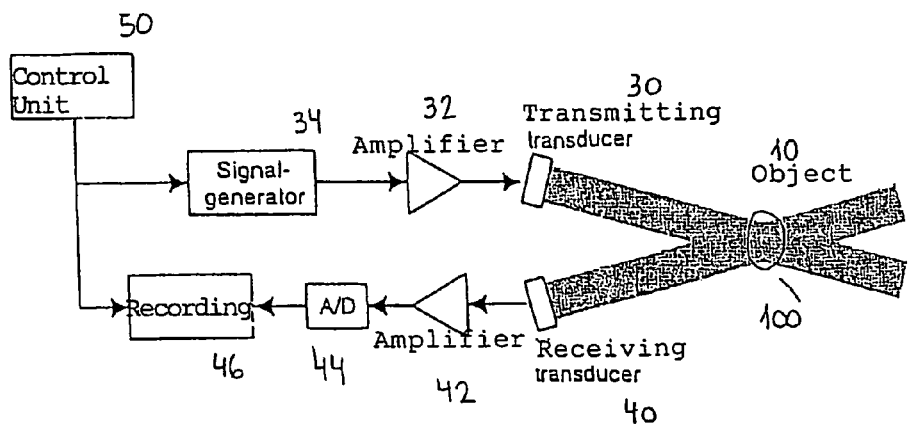
FIGS. 3A-3B are block diagrams of embodiments of an identification system where identification chips according to the invention are employed.

FIG. 3A illustrates a block diagram for an identification system where identification chips according to the invention are employed.

The system is based on the transmission of an acoustic polling signal and measurement of an acoustic response signal. An identification chip comprises a resonator that exhibits a combination of resonant frequencies. By comparing the characteristics of the transmitted and detected signals, the system is arranged to derive a unique identity associated with the identification chip.

The object, usually a fish or another living organism, is tagged with an identification chip 100 according to the invention. A transmitting transducer 30 is arranged to transmit acoustic waves towards the object 10, and a receiving transducer 40 is arranged to receive acoustic waves from the object 10.

Between the object 10 and each transducer 30, 40 is a liquid, usually water, including salt water.

The system further comprises a control unit 50, which controls a signal generator 34 and a recording unit 46. The signal generator 34 is arranged to provide a signal that includes frequencies in the ultrasound range, especially in the frequency range 20 kHz-3 MHz, and more preferably between 100 kHz and 300 kHz. The signal may be narrow band, the control unit being arranged to vary or sweep the signal frequency over a wider area over a period of time. Alternatively the signal may be broad band with a known spectrum. The signal is amplified by means of an amplifier 32, which supplies an amplified signal to the transmitting transducer 30.

The receiving transducer 40 is arranged to intercept a reflected or scattered acoustic signal, which is influenced by the identification chip 100 in the object 10.

The signal from the receiving transducer 40 is fed to an amplifier 42, and the output signal herefrom is converted to a digital signal by means of the analog-digital converter 44. The digital signal is fed to the recording unit 46, which also receives a control signal from the control unit 50. The recording unit comprises a computer with a program, which on execution compares information on the transmitted acoustic signal and the received acoustic signal, and which, by establishing the resonant frequency derives an identification associated with the identification chip 100.

Figure 3B:
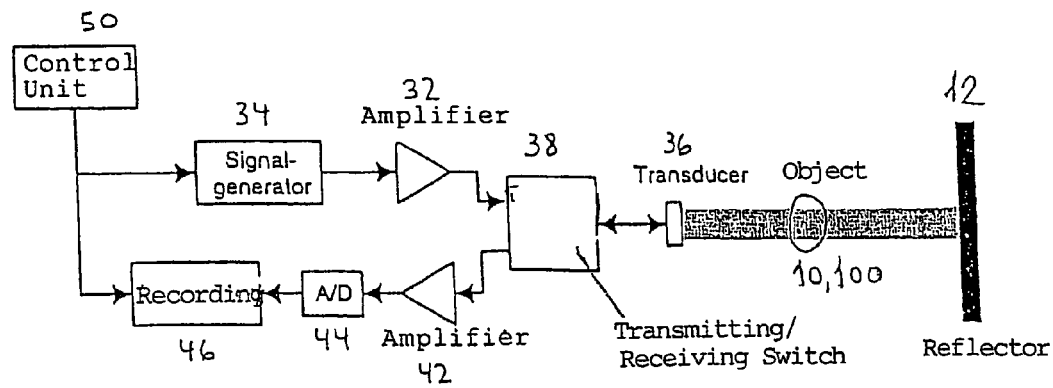

FIG. 3B illustrates an alternative embodiment of the system, where instead of a separate transmitting transducer 30 and receiving transducer 40, a combined transmitting and receiving transducer 36 is employed, which is arranged to act as transmitter and receiver in different periods. The transducer 36 is connected to a transmitting/receiving switch 38, which directs a signal that has to be supplied by the amplifier 32 to the transducer 36 when it is used as a transmitter, or it directs a signal received by the transducer when it is used as a receiver, to the amplifier 42. In FIG. 3B a reflector 12 is also provided on the opposite side of the object 10. This causes the signal received by the transducer 36 to be transmitted first through the object, including the identification chip 100, and then reflected by the reflector. The system may also be implemented without reflector 12.

Other combinations and alternatives are possible for the system. For example, the measuring set-up with a common transmitting and receiving transducer 36 may be employed in the measuring arrangement without a reflector as illustrated in FIG. 3A. Based on FIG. 3A, another variant is to place a transmitting and receiving transducer on opposite sides of the object. In order to cover a wider total frequency range, it may also be expedient to use more than one transmitting and/or receiving transducer with different crossover frequency ranges or centre frequencies.

Figure 4A:
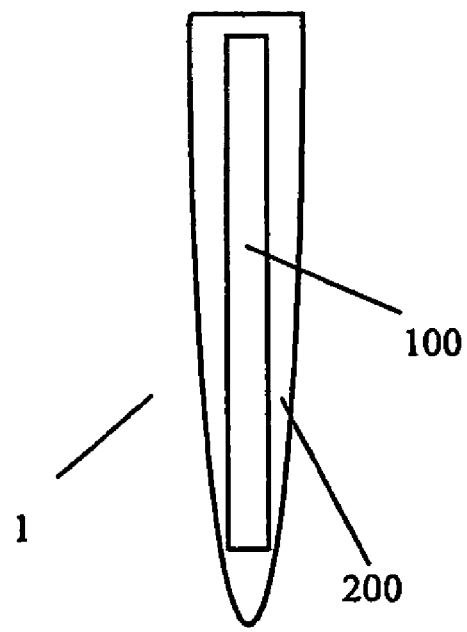
FIGS. 4A-4B are cross sectional views of an identification chip adapted for insertion in a fish.

FIG. 4A illustrates a cross sectional view of an identification chip adapted for easy insertion in a fish.

The identification chip 1 comprises an acoustic resonator 100 according to any of the embodiments described above. The resonator may also comprise an encapsulation, as mentioned above.

The chip 1 further comprises a pointed sheath 200 made of a material that is capable of melting, dissolving or breaking down in the living organism. Use is preferably made of ice. The sheath 200 simplifies the insertion of the identification chip in the organism.

Figure 4B:
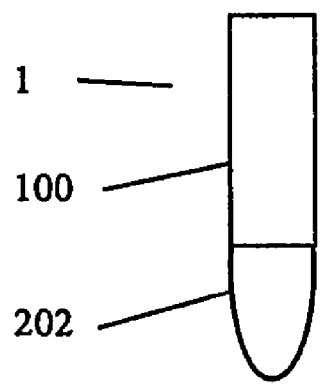

FIG. 4B illustrates a cross sectional view of a variant of an identification chip adapted for easy insertion in a fish.

The identification chip comprises an acoustic resonator 100 according to any of the embodiments described above. The resonator may also comprise an encapsulation as mentioned above.

The chip 1 further comprises a needle-shaped extension part 202 made of a material that is capable of melting, dissolving or breaking down in the living organism. Use is preferably made of ice. This extension part 202 simplifies the insertion of the identification chip in the organism.

FIGS. 5A-5D illustrate cross sectional views of sections of a resonator in an identification chip according to the invention, manufactured by means of surface micromachining.

In each of the FIGS. 5A-5D one of several cavities in an acoustic resonator 100 in an identification chip is illustrated for identification of an object located in a liquid. The acoustic resonator 100 exhibits a number of distinct resonant frequencies, where the combination of resonant frequencies is unique to the identification chip. The resonator 100 comprises a cavity-forming part 110 and a membrane 130. The acoustic resonant frequencies are determined by the at least one cavity 140, which is enclosed by the cavity-forming part 110 and the membrane 130. The resonator 100 is manufactured by surface micromachining.

The cavity-forming part 110 is preferably a substrate of silicon, but glass may be an alternative possibility. The production is based on an Si wafer, on which the desired structures are formed by depositing films, patterning them and etching from the same side of the wafer all the time. An important feature in these processes employed is so-called sacrificial layers, which are layers inserted in the structure to enable overlying layers to be later detached from those located below by etching away the sacrificial layer. The sacrificial layer must be able to withstand the processing stages the wafer has to undergo from its being deposited until it is etched away, e.g. the heating that is necessary in order to give following layers the desired characteristics. The sacrificial layer also has to be capable of being removed by etching without damaging other parts of the wafer. For these purposes the sacrificial layer normally consists of a more or less doped silicon oxide, or alternatively a photoresist or a metal.

The resonator 100 may be manufactured by first depositing a sacrificial layer in the form of a silicon oxide on a flat Si wafer. Alternatively, a glass wafer may be employed. The sacrificial layer is further patterned in such a manner that it assumes the form of the desired cavities 140. A film then has to be applied that has to form the membrane 130, preferably consisting of polycrystalline silicon (polysilicon) or silicon nitride. The sacrificial layer is then removed by etching. This is generally performed by etching one or preferably many small holes in the membrane 130, through which the etching agent can reach the sacrificial layer. These holes must be sealed later, which can be done by applying a thicker layer of the membrane material, or by placing the openings of the sacrificial layer outside the actual membranes in "passages" of the sacrificial material out from the actual cavities. The holes can then be sealed by putting on material only near the holes and letting the actual membrane be as it was after the initial depositing. It will often be easier to control the final membrane thickness in this manner.

Figure 5A:
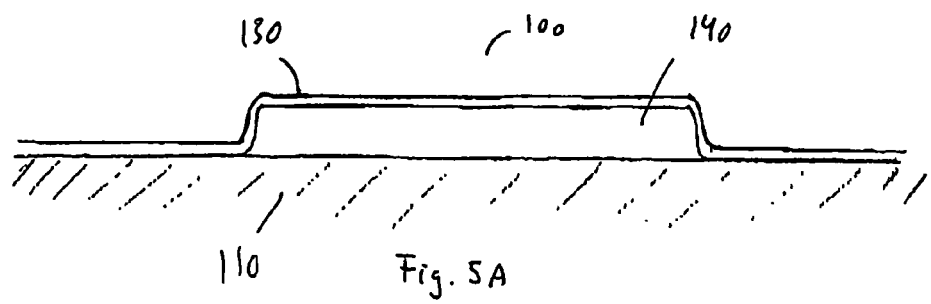
FIGS. 5A-5D are cross sectional views of sections of a resonator in an identification chip according to the invention, manufactured by means of surface micromachining.

FIG. 5A illustrates a cavity 140 in a resonator 100 manufactured by means of surface micromachining. The membrane 130 has a raised portion, while the substrate 110 is flat. In the manufacture of this embodiment, a sacrificial layer of, e.g. silicon oxide is first deposited uniformly over the entire Si wafer. This is then patterned by means of etching with the result that only the part of the sacrificial layer corresponding to the desired cavity 140 is left. The etching agent does not attack the substrate wafer, with the result that the substrate 110 remains flat after the etching process. A membrane film is deposited over the entire wafer. The membrane film is then opened into the sacrificial layer, the sacrificial layer is etched out, and the etched holes sealed.

Figure 5B:
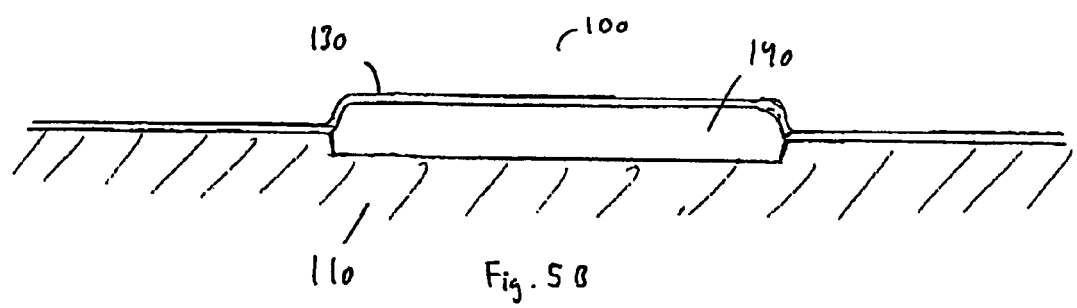

FIG. 5B also illustrates a cavity 140 in a resonator 100 manufactured by surface micromachining. The membrane 130 has a raised portion, while the substrate 110 has a recess in the area intended to define the cavity 140. This embodiment is manufactured by firstly covering the substrate 110 with a thin silicon nitride film, which is removed in the area intended to define the cavity 140. The wafer is then heated by steam, with the result that a silicon dioxide layer is grown where the nitride has been removed. The silicon dioxide layer here constitutes the sacrificial layer. The Si nitride can then be removed. The actual membrane film (e.g. silicon nitride) is then deposited over the entire wafer. It is then opened up into the sacrificial layer, this is etched out, and the etched holes are sealed. Since the oxidation of the Si wafer consumed a little of the Si material, the cavity 140 appears partially sunk into the Si wafer. The embodiment in FIG. 5B is akin to the embodiment illustrated in FIG. 2D, but in the description of FIG. 2D the substrate material is specified as glass, and this may involve the need for "silicon fusion bonding" in order to achieve sufficiently good bonding between substrate and membrane or film.

Figure 5C:
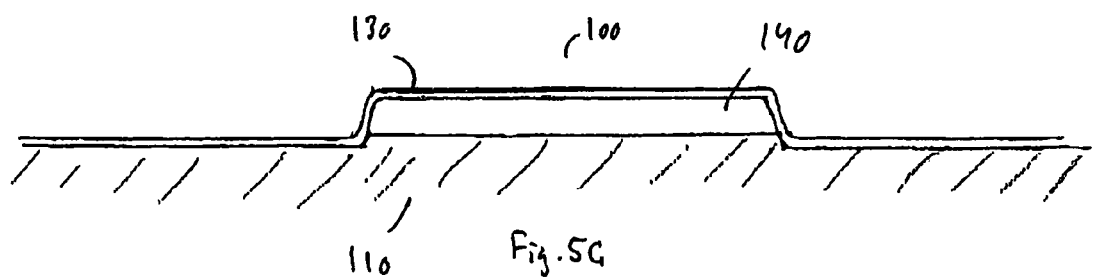

FIG. 5C also illustrates a cavity 140 in a resonator 100 manufactured by surface micromachining. The membrane 130 has a raised portion, while the substrate 110 also has a raised portion, albeit a lower one, in the area intended to define the cavity 140. In manufacturing this embodiment, a sacrificial layer is first deposited or grown uniformly over the entire Si wafer. This is then patterned by etching. If an etching technique is employed that also attacks the Si wafer, the final resonator will appear somewhat raised above the surface of the wafer. The membrane film is deposited over the entire wafer, whereupon the sacrificial layer is etched out as indicated above.

Figure 5D:
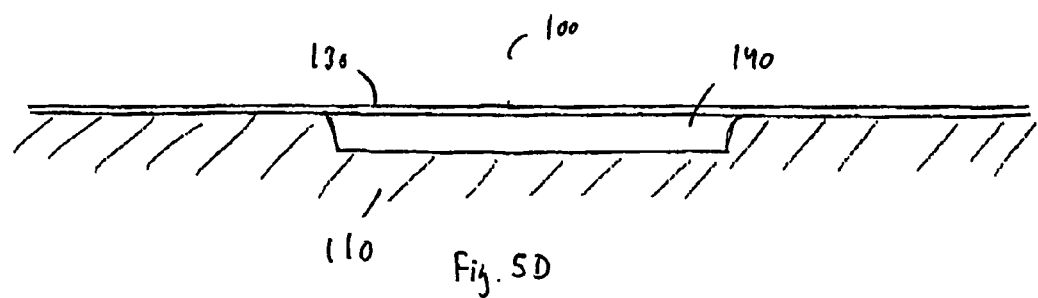

FIG. 5D also illustrates a cavity 140 in a resonator 100 manufactured by surface micromachining. Here the membrane 130 is flat, in the same way as the embodiments illustrated in FIGS. 2A-2E. The substrate 110 has a recess in the area that defines the cavity 140. In order to achieve this structure, the membrane film is transferred from a second substrate. In this case a recess first has to be etched out, or the areas round the recess have to be built up, and a flat film is then bonded on the top. This is accomplished in practice by the film being formed on a second substrate, which is then bonded to the original wafer with the film facing the wafer. The supporting wafer for the film can then be etched away.

It is true for all the embodiments of the invention that the resonant frequency is influenced by flexural strength and elasticity in the membrane, size and shape of the membrane, the attachment of the membrane along the periphery and the height h of the cavity under the membrane if this is gas-filled with a pressure p where h/p<10 μm/atm. If, however, the cavity is evacuated, the height h will not be important for the resonant frequency, provided the height h is sufficiently great (h>1 μm) to ensure that the membrane does not strike the bottom of the cavity during excitation by the polling signal.

It will be appreciated that many possibilities exist for layout of the cavities on the identification chip. For example, the cavities may be arranged in 1, 2, 3 or 4 rows. In an elongated or rod-shaped embodiment, which is preferred for a chip for implanting in a fish, one single row will be appropriate.

The invention claimed is:

1. An identification chip for identification of an object, comprising an acoustic resonator (100), which exhibits a number of distinct resonant frequencies, where the combination of resonant frequencies is unique to the identification chip, thus enabling the identification chip to be identified by exposing the chip to an acoustic polling signal, measuring an acoustic response signal and analysing the frequency of the response signal, wherein the identification chip is arranged for identifying an object located in a liquid, wherein the resonator (100) comprises a cavity-forming part (110, 120) and a membrane (130), and wherein the acoustic resonant frequencies are determined by at least one cavity (140), which is enclosed by the cavity-forming part (110, 120) and the membrane (130), where the cavity-forming part (110, 120) is composed of a substrate (110) with an upper surface that has at least one recess, and where the membrane's (130) lower surface is attached to the substrate's upper surface in such a manner that the at least one cavity is enclosed by the at least one recess and the membrane (130).

2. An identification chip according to claim 1,
where the membrane's (130) upper surface is attached to the lower surface of an etchable wafer (150), and where the etchable wafer (150) comprises through-going openings, which coincide with the at least one recess in the substrate (110).

3. An identification chip for identification of an object, comprising an acoustic resonator (100), which exhibits a number of distinct resonant frequencies, where the combination of resonant frequencies is unique to the identification chip, thus enabling the identification chip to be identified by exposing the chip to an acoustic polling signal, measuring an acoustic response signal and analysing the frequency of the response signal, wherein the identification chip is arranged for identifying an object located in a liquid, wherein the resonator (100) comprises a cavity-forming part (110, 120) and a membrane (130), and wherein the acoustic resonant frequencies are determined by at least one cavity (140), which is enclosed by the cavity-forming part (110, 120) and the membrane (130), where the cavity-forming part (110, 120) is composed of a substrate (110) with an upper surface and an etchable wafer (120) with a lower surface attached to the substrate's (110) upper surface, where the etchable wafer's upper surface is also attached to the membrane's (130) lower surface, and where the etchable wafer (120) comprises at least one through-going opening between the lower and upper surfaces, with the result that the at least one cavity is enclosed by the substrate, the at least one through-going opening and the membrane.

4. An identification chip according to claim 3, where the etchable wafer (120) has one through-going opening between the lower and upper surfaces, with the result that the chip comprises one cavity, and where the different resonant frequencies result from the membrane's lower surface comprising areas covered by etchable material (122).

5. An identification chip according to claim 4, comprising a plurality of cavities of different size, with the result that the identification chip exhibits a plurality of different resonant frequencies.

6. An identification chip according to claim 2,
where the substrate is composed of a wafer made of glass, where the etchable wafer is made of silicon and where the membrane is made of silicon nitride.

7. An identification chip according to one of the claims 1-6, for implanting in a living organism such as a fish,
where the chip further comprises a suppository-shaped extension part or a pointed sheath, made of a material that is capable of being dissolved or broken down in the living organism, where the extension part or sheath simplifies the implantation of the identification chip.

8. An identification chip according to claim 7,
where the extension part or the sheath is made of ice.

9. An identification chip according to claim 1,
where the resonator is manufactured by means of surface micromachining.

10. An identification chip according to claim 9,
where the cavity-forming part (110, 120) is composed of a substantially flat substrate (110), and where the membrane (130) has at least one raised area, and where the membrane's (130) lower surface is attached to the substrate's tipper surface, with the result that the at least one cavity is enclosed by the substrate and the raised area of the membrane (130).

11. An identification chip according to claim 10,
where the substantially flat substrate (110) is flat.

12. An identification chip according to claim 10,
where the substantially flat substrate (110) is lowered or raised in the area corresponding to the cavity (140).

13. An identification chip according to one of the claims 1-6 or 9-12,
where the acoustic resonant frequencies are dependent on properties of the membrane, particularly flexural strength, elasticity, size and shape of the membrane.

14. A method for tagging and identifying an object located in a liquid, comprising the steps of
equipping the object with an identification chip as indicated in one of the claims 1-6, exposing the object and thereby the identification chip to an acoustic polling signal, measuring an acoustic response signal,
analysing the frequency of the response signal, and on the basis of the analysis, identifying the identification chip and thereby the object.

15. A method according to claim 14,
where the object is a living organism such as a fish, and where the step of equipping the object with an identification chip involves inserting the identification chip in the organism.

16. A system for tagging and identifying an object located in a liquid, comprising
a tagging device arranged for equipping the object with an identification chip as indicated in one of the claims 1-6
an acoustic transmission device for exposing the object and thereby the identification chip to an acoustic polling signal,
a measuring device for measuring an acoustic response signal,
a computer arranged for
reading and analysing the frequency of the response signal, and
on the basis of the analysis identifying the identification chip and thereby the object.

17. A system according to claim 16,
where the object is a living organism such as a fish, and where the tagging device is arranged to insert the identification chip in the organism.

* * * * *